United States Patent [19]
Ashe

[11] Patent Number: 5,567,053
[45] Date of Patent: Oct. 22, 1996

[54] TEMPERATURE SENSING APPARATUS

[75] Inventor: John B. Ashe, Asheville, N.C.

[73] Assignee: Figgie International Inc., Willoughby, Ohio

[21] Appl. No.: 366,661

[22] Filed: Dec. 23, 1994

[51] Int. Cl.⁶ .............................. G01K 1/14; G01K 5/62
[52] U.S. Cl. .......................... 374/155; 374/207; 374/208; 73/866.3; 73/866.5; 137/846
[58] Field of Search .................................... 374/155, 205, 374/206, 207, 208, 141; 73/866.3, 866.5; 137/845, 846

[56] References Cited

U.S. PATENT DOCUMENTS

| 236,719 | 1/1881 | Renton | 137/845 |
|---|---|---|---|
| 3,373,611 | 3/1968 | Trott | 374/155 |
| 3,623,370 | 11/1971 | Busch et al. | 374/207 |
| 3,851,529 | 12/1974 | Andrews et al. | 374/206 |
| 3,952,596 | 4/1976 | Patel | 374/207 |
| 4,232,518 | 11/1980 | Suzuki et al. | 137/845 |
| 4,302,965 | 12/1981 | Johnson et al. | 374/142 |
| 4,595,301 | 6/1986 | Taylor | 374/207 |
| 4,794,942 | 1/1989 | Yasuda et al. | 137/845 |
| 4,958,938 | 9/1990 | Schwartz et al. | 374/208 |
| 5,312,188 | 5/1994 | Ashe | 374/155 |

*Primary Examiner*—Diego F. F. Gutierrez
*Attorney, Agent, or Firm*—Ralph E. Jocke

[57] ABSTRACT

A temperature sensing apparatus (10) adapted for sensing the temperature of a food item or the environment in an oven includes a body (12) which encloses a chamber (38). The chamber houses an indicator (22) which is viewed through a frangible glass pane (34). Slight amounts of water vapor that infiltrate into the chamber during washing are vented when the apparatus is placed in a high temperature environment. A resilient member (70) having a lip portion (74) is normally in abutting relation with an outer case wall surface (48). When pressure builds in the chamber during heating due to rapid expansion of the water vapor, the pressure applied through an opening (40) acts against the lip portion of the resilient member. When the pressure rises to a sufficient level, it deforms the lip portion away from the adjacent wall surface whereby pressure is relieved to atmosphere. The pressure in the chamber is relieved before it reaches a level that may fracture the frangible glass pane or cause other damage. When the pressure falls, the lip portion returns to its initial configuration again closing the chamber.

20 Claims, 4 Drawing Sheets

TEMPERATURE SENSING APPARATUS

TECHNICAL FIELD

This invention relates to temperature sensing instruments. Particularly this invention relates to a thermometer for use in sensing the temperature of a heated item such as a food item in an oven environment.

BACKGROUND ART

Many types of thermometers are known in the prior art. A popular type of thermometer is a cooking thermometer that includes a probe portion which is inserted into a food item being cooked in an oven. The cooking thermometer typically includes a dial or other visual readout that indicates how hot the food is. By observing the temperature of the food and by monitoring the cooking time in the oven, it is assured that the food is properly cooked.

Most cooking thermometers include a body which encloses a chamber. The chamber houses an indicator that visually displays the temperature at the probe portion. The Chamber is bounded by a glass or other frangible pane through which the indicator is observed. A gasket is typically mounted under the glass pane to seal the chamber from the environment.

Cooking thermometers must be thoroughly cleaned between uses. This is done to remove food particles and to avoid the growth of harmful bacteria. The most common way of washing a cooking thermometer is to place it in an automated washer in which it is immersed in a hot water based cleaning solution.

Because of the different rates of thermal expansion of the glass pane and the typical metal body of the cooking thermometer, water vapor may infiltrate past the gasket into the chamber of the thermometer. When this occurs, water vapor is trapped inside the chamber upon cooling.

When a cooking thermometer with water trapped inside is placed in an oven, the water vapor expands rapidly upon heating. This causes pressure to build in the chamber. Such pressure may cause damage to the seal, or if the seal does not rupture, the glass pane may fracture. In either event, the thermometer becomes unusable.

Thus there exists a need for a temperature sensing apparatus that may be used to sense temperature in a hot oven environment but which will not be damaged by the infiltration of water vapor which may enter the interior of the apparatus during cleaning.

DISCLOSURE OF INVENTION

It is an object of the present invention to provide a temperature sensing apparatus that is used to sense temperatures by placement in a hot oven environment.

It is a further object of the present invention to provide a temperature sensing apparatus that may be immersed in water for cleaning.

It is a further object of the present invention to provide a temperature sensing apparatus that will not be damaged by water vapor that infiltrates into the interior of the device.

It is a further object of the present invention to provide a temperature sensing apparatus that includes pressure relief means for safely relieving pressure from the interior of the apparatus.

It is a further object of the present invention to provide a temperature sensing apparatus that includes pressure relief means that reseals itself once the pressure in the apparatus is relieved.

It is a further object of the present invention to provide a temperature sensing apparatus that is accurate, reliable and durable.

It is a further object of the present invention to provide an instrument having an enclosed chamber that includes means for safely relieving pressure from the interior of the chamber without fracturing a frangible transparent member which enables viewing the interior of the chamber.

Further objects of the present invention will be made apparent in the following; Best Mode for Carrying Out Invention and the appended claims.

The foregoing objects are accomplished in the preferred embodiment of the present invention by a cooking thermometer used in an oven environment for indicating the temperature of a food item. The cooking thermometer has a body that includes a probe portion for insertion into the food item. The body also includes an internal chamber which houses an indicator for indicating the temperature at the probe portion. The indicator is controlled by a thermal expansion spring which is adapted to move the indicator in response to thermal change. The internal chamber of the thermometer is bounded by a frangible glass pane which enables viewing of the indicator therethrough.

The chamber of the thermometer is bounded on the side opposed from the glass pane by a case wall. A tube of the probe portion extends outward from the case wall. An annular opening extends through the case wall in surrounding relation of the tube. A closure member extends in surrounding relation of the tube on the outside of the chamber. The closure member includes an annular recess that extends in opposed facing relation of the case wall.

An annular resilient member is positioned in the recess of the closure member. The resilient member extends in abutting relation between the exterior surface of the case wall and the closure wall surface of the closure member. The resilient member includes a radially outwardly extending finger portion that engages the outer surface of the case wall. The resilient member thereby forms an annular seal in surrounding relation of the opening.

During washing, small amounts of moisture may infiltrate into the interior chamber of the cooking thermometer. The usual source of such water infiltration is the seal around the glass pane.

When the thermometer is next placed in an oven environment, the water vapor inside the chamber expands rapidly. The expansion increases the pressure in the chamber. This pressure acts against the lip portion of the resilient member. Eventually the pressure in the chamber reaches a sufficient level, that the lip portion of the resilient member is deformed so as to disengage from the adjacent case wall surface. This provides a path for pressure to escape from the chamber to atmosphere. Once the excess pressure is released, the resilient member returns to its original configuration and engages the case wall surface. This again seals the chamber.

The cooking thermometer of the present invention further includes a connecting bushing member that extends in connection with the tube to the interior of the chamber. The connecting bushing member includes an inner annular flange surface which extends generally parallel with and interiorly of the case wall. A compression spring member extends between the annular flange of the connecting bushing member and the interior surface of the case wall. As a result, the compression spring biases the connecting bushing member inward and holds the closure member and resilient member in close abutting relation with the case wall. This construction also enables the components to undergo thermal expansion at different rates through repeated cycles without undergoing separation or loosening of the components.

BEST MODE FOR CARRYING OUT INVENTION

Figure 1:
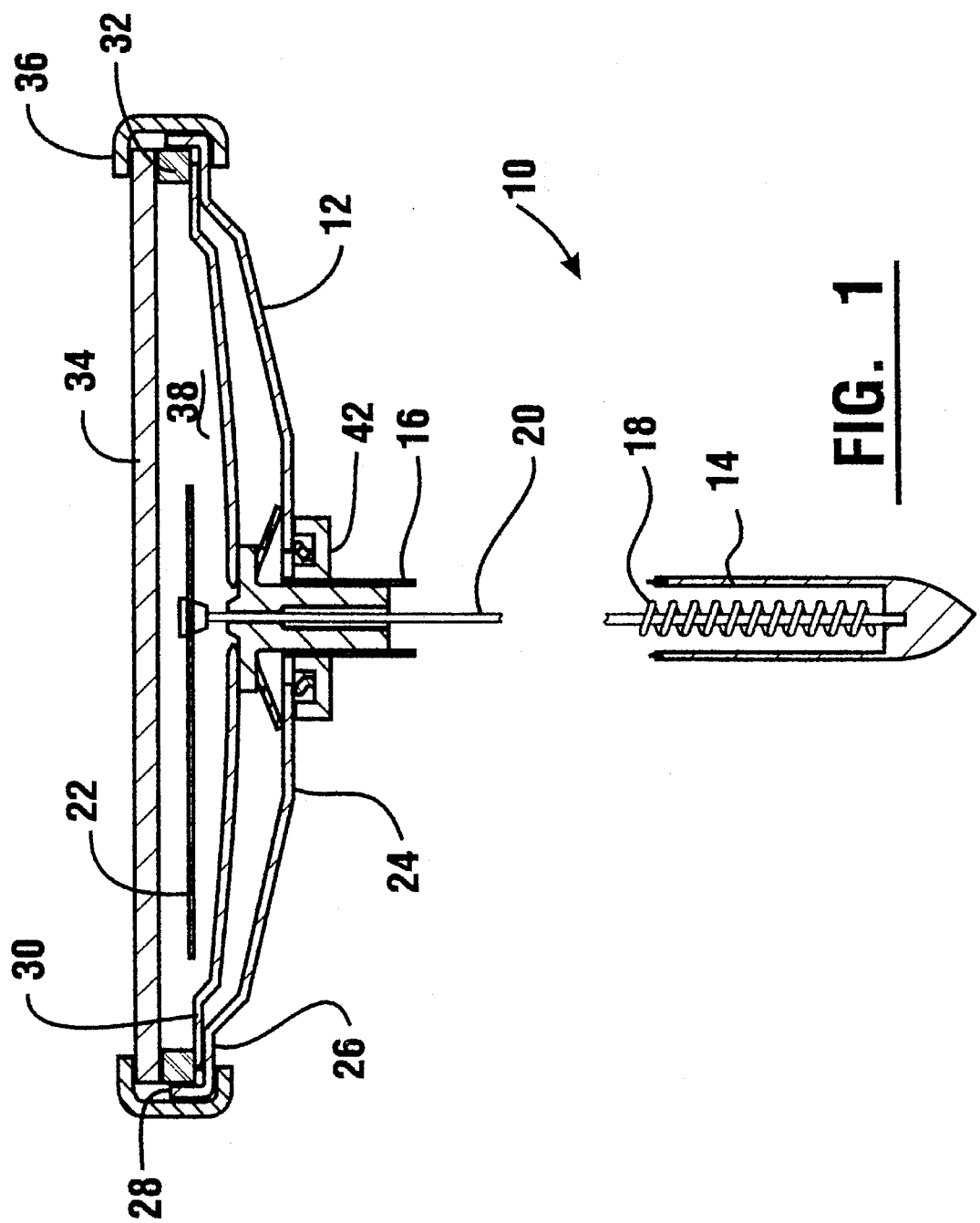
FIG. 1 is a side cross sectional view of the preferred embodiment of the temperature sensing apparatus of the present invention.

Referring now to the drawings and particularly FIG. 1, there is shown therein the preferred embodiment of the temperature sensing apparatus of the present invention generally indicated 10. The apparatus is specifically adapted for use as a cooking thermometer and includes a body 12 with a probe portion 14. Probe portion 14 is adapted for insertion into foods such as meat or poultry for sensing the temperature thereof during cooking. Alternatively, the apparatus 10 may be placed in an oven apart from a food item to indicate oven temperature.

Probe portion 14 is bounded by a tube 16 which encloses a thermal expansion spring 18. A shaft 20 extends through the middle of tube 1.6 and has mounted at the top thereof an indicator 22 which is preferably a pointer. Spring 18 expands and contracts in a rotational direction in response to the temperature of probe portion 14 and thereby rotates the shaft. This results in rotational movement of indicator 22. The position of the indicator is indicative of the temperature sensed.

Body 12 includes a case wall 24. Case wall 24 in cross section includes an annular outward extending land 26 in an annular upturned portion 28. Land 26 supports a circular dial wall 30 thereon. Dial wall 30 underlies indicator 22 and preferably has indicia thereon which are representative of temperature for a corresponding position of the indicator. An annular gasket 32 is supported on the peripheral portions of dial wall 30. The gasket 32 is bounded outwardly by annular upturned portion 28 of case wall 24. A frangible glass pane 34 is supported on gasket 32. A circular, c-shaped clamping member 36 extends in surrounding relation of pane 34 and holds gasket 32 in compressed relation. The clamping member holds pane 34, gasket 32, dial wall 30 and case wall 24 in connected relation. In this way, glass pane 34, gasket 32 and case wall 24 enclose an internal chamber generally indicated 38 inside the body of the thermometer.

Figure 2:
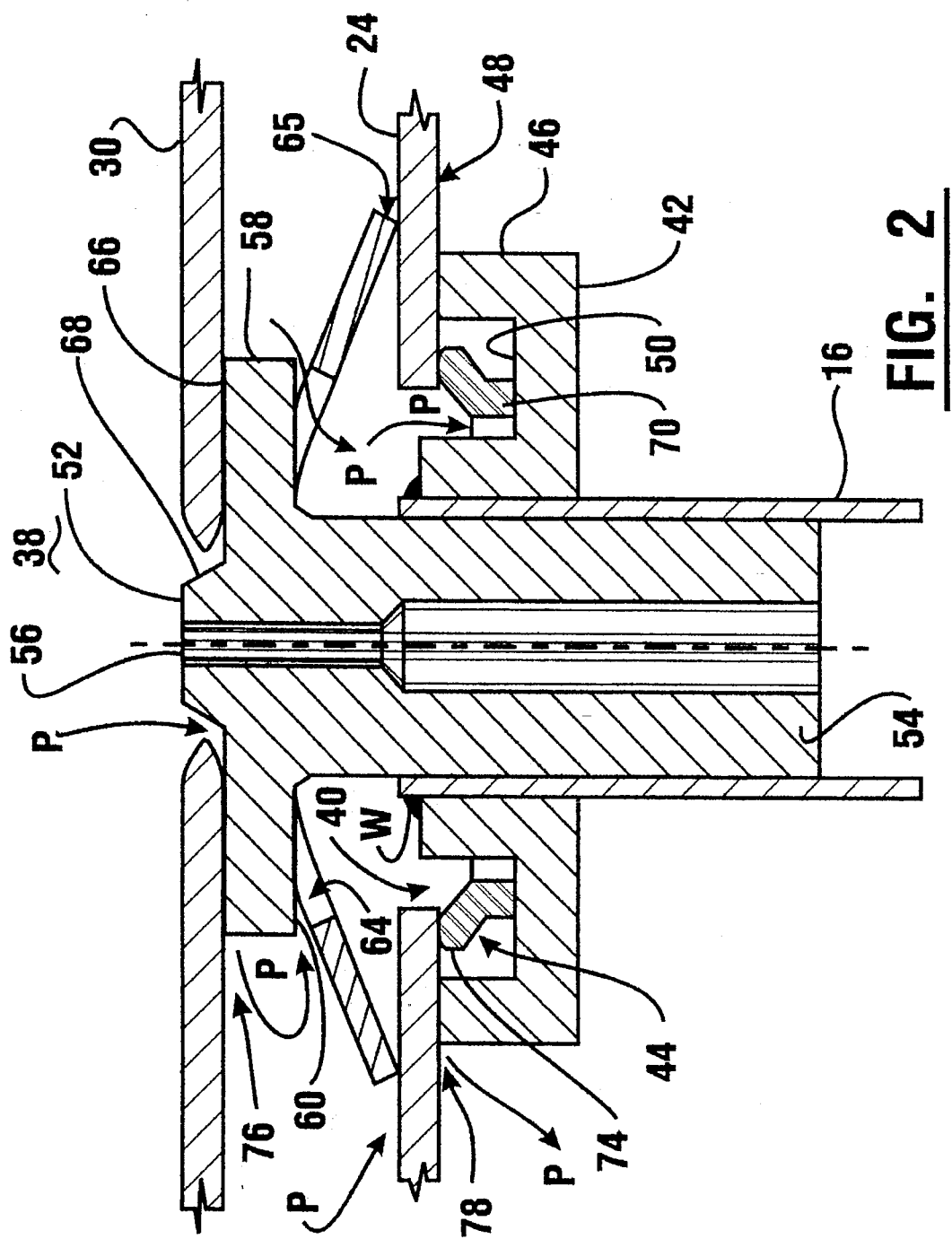
FIG. 2 is an enlarged view of the closure member, connecting bushing and resilient member of the present invention showing the pressure relief path from the chamber.

As best shown in FIG. 2, back wall 24 has an annular opening 40 therein. Tube 16 of probe portion 14 extends in centered relation relative to the opening. A closure member 42 extends in surrounding relation of tube 16. Closure member 42 is a transition fitting which includes an annular recess 44 therein. Closure member 42 also has an outer flange 46 which extends longitudinally and engages the outer case wall surface 48. Recess 44 is bounded by a closure wall surface 50 which extends in opposed facing relation with case wall surface 48. Closure member 42 is attached to tube 16, preferably by welding or brazing (w).

A connecting bushing member 52 extends in chamber 38 interiorly of opening 40. Bushing member 52 includes a bushing portion 54 which extends in the interior of tube 16 and is held therein by an interference fit. Tube 16 is thereby held in sandwiched relation between bushing portion 54 and closure portion 42. Bushing member 52 also includes a longitudinal opening 56 through which shaft 20 extends in close fitting relation. Shaft 20 is enabled to rotate in bushing 52.

Figure 4:
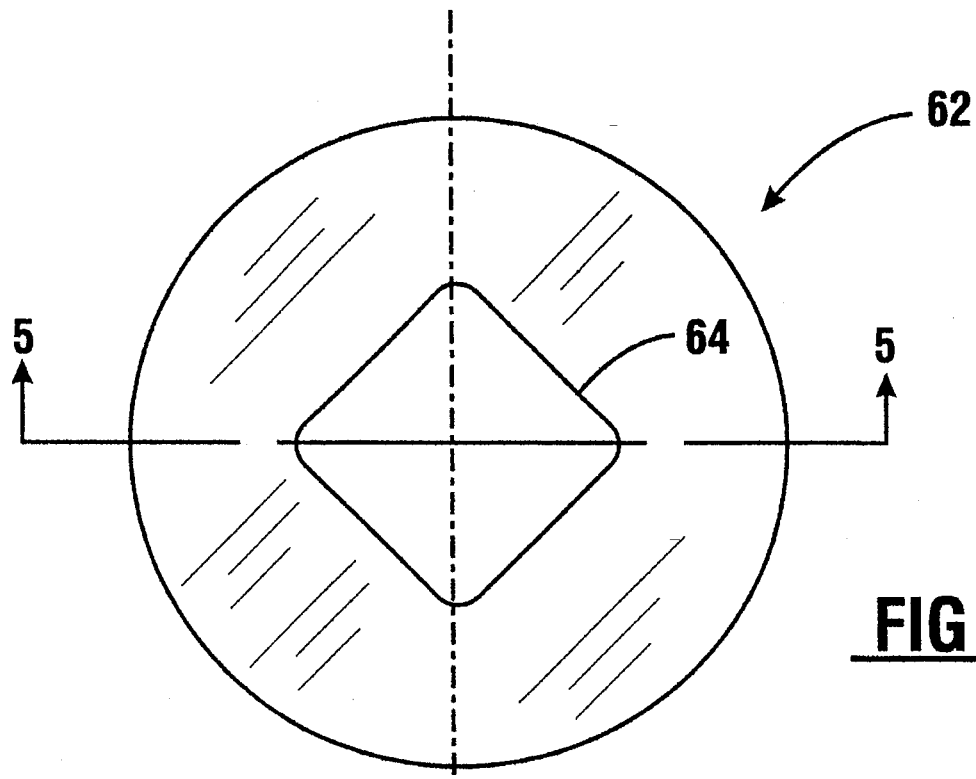
FIG. 4 is a top plan view of the compression disk spring of the present invention.
Figure 5:
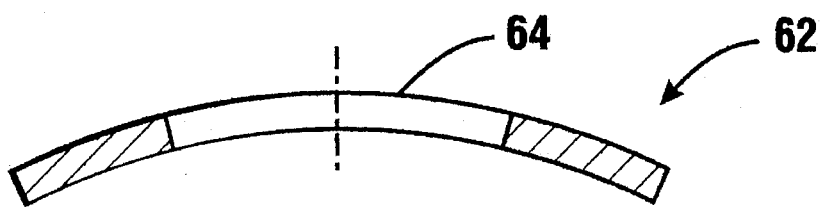
FIG. 5 is a side cross sectional view of the spring member along line 5—5 in FIG. 4.

Connecting bushing member 52 has an annular flange 58. Flange 58 has an inner annular flange surface 60. Flange surface 60 is disposed in chamber 38 longitudinally inward from opening 40. Inner annular flange surface 60 engages a spring member 62. As shown in FIGS. 4 and 5, spring member 62 is a disk-type compression spring which has an opening 64 therethrough. As shown in FIG. 2, opening 64 enables the bushing portion 54 of connecting bushing member 52 to extend therethrough with additional clearance. The significance of this is later discussed in detail.

In the preferred form of the invention, spring member 62 extends in compressed relation between inner annular flange surface 60 and the interior surface of case wall 24. Spring 62 biases bushing member 52 inwardly into chamber 38. As a consequence, closure member 42 is held closely adjacent to outer case wall surface 48. This construction assures that the closure member and tube 16 which is connected thereto are held in tight fitting relation against case wall 24. Thermal expansion caused by repeated heating and cooling cycles does not adversely affect the relative tightness of the assembly and provides for a long operational life.

Flange 58 of connecting bushing member 52 also has a dial supporting flange surface 66. Dial supporting flange surface 66 supports dial wall 30 thereon. Dial wall 30 extends in surrounding relation of a circular projection 68 at the center of bushing member 52.

Figure 3:
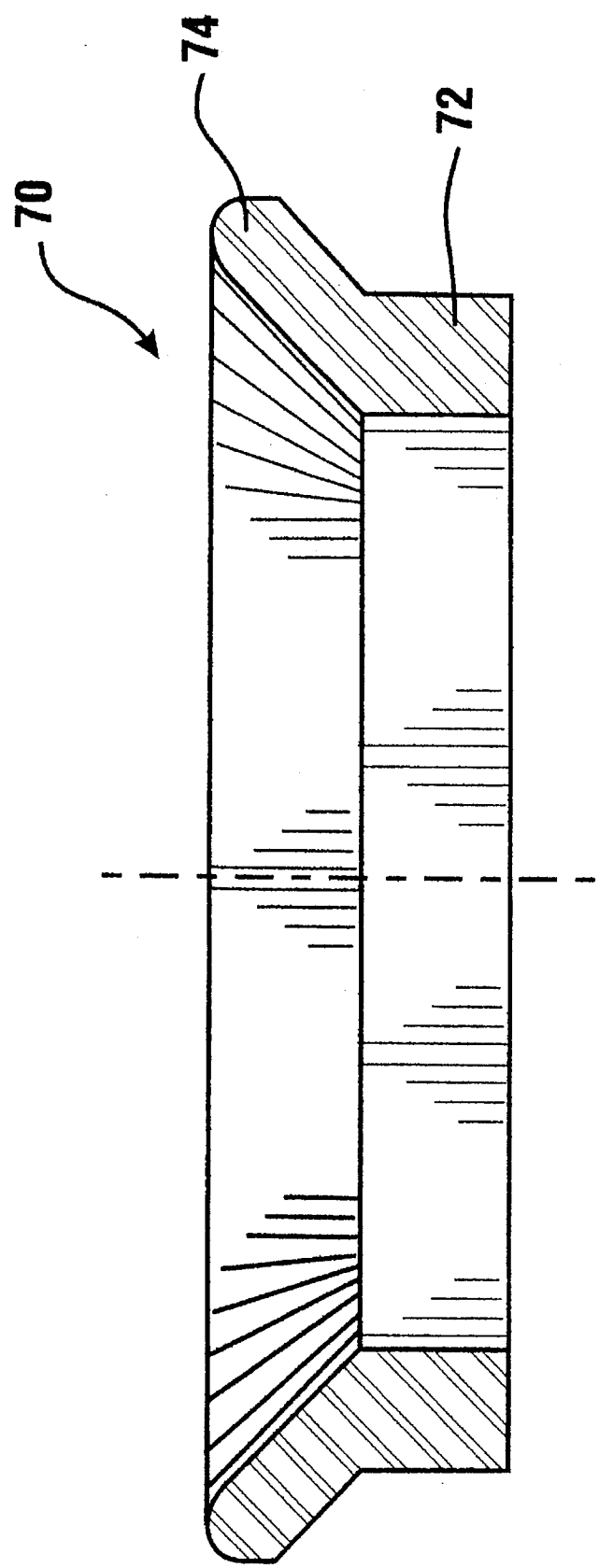
FIG. 3 is a side cross sectional view of the resilient member of the present invention.

Positioned in recess 44 of closure member 42 is an annular resilient member 70. As best shown in FIG. 3, resilient member 70 includes in cross section a relatively thick base portion 72 and a relatively thinner and more flexible finger portion 74. As shown in FIG. 3, finger portion 74 is an annular extending portion that outward from base portion 72. In the preferred form of the invention, resilient member 70 is comprised of high temperature resistant silicone material. This enables the apparatus to be used successfully through many cooking and cleaning cycles without losing its resilient properties.

As shown in FIG. 2, resilient member 70 extends in abutting relation between outer case wall surface 48 and closure wall surface 70. Finger portion 74 of resilient member 70 engages outer case wall surface 48 in surrounding-relation of opening 40 so as to form a fluid tight seal therewith.

In the preferred embodiment of the invention, dial wall 30 is supported by a loose contact fit on dial supporting flange surface 66. Differences in contour and this loose contact fit enable at least one small inner fluid passage generally indicated 76, to extend from the area of the chamber 38 bounded by the dial wall 30 and the glass pane 34, to the area of chamber 38 between the case wall 24 and the dial wall 30. Similarly, slight differences in contour between the outer flange of closure member 42 and outer case wall surface 48 provides at least one minute outer fluid passage generally indicated 78 which extends between the annular area of recess 44 that is radially outward of resilient member 70, and atmosphere.

In operation, the temperature sensing apparatus 10 is placed in an oven with the probe portion extending into the food item being cooked. The temperature of the entire apparatus will reach several hundred degrees and the probe portion will operate to indicate the temperature of the food item through the movement of indicator 22 above the indicia on dial wall 30.

If water vapor has previously entered the chamber 38 during washing, the heating of the water vapor in the high temperature environment causes it to expand rapidly building pressure inside of chamber 38. The pressure is relieved from the area shown above dial wall 30 through inner fluid passage 76 as indicated by arrows P. Pressure is thereby enabled to be relieved in the area of chamber 38 between dial wall 30 and case wall 24. Pressure is also enabled to be relieved through opening 64 in spring member 62. Likewise pressure is relieved through an opening 65 created by the natural, non-flattening characteristic of spring member 62. As a result, pressure in chamber 38 is applied to opening 40 where it acts on resilient member 70.

If the pressure in chamber 38 builds sufficiently, the pressure force acting through opening 40 deforms finger portion 74 so as to cause it to disengage from surface 48 which is adjacent thereto. When this occurs, the pressure is enabled to be relieved from the recess 44 in closure member 42 through the outer fluid passage 78. As a result, the excess pressure escapes to atmosphere. This eliminates the buildup of excessive pressure in chamber 38 which would otherwise cause breakage of the frangible glass pane or the blowout of gasket 32. Because of the greater thickness of base portion 72, it deforms substantially less in response to internal pressure than the finger portion.

Once the excess pressure in chamber 38 has escaped, the finger portion 74 of resilient member 70 is no longer deformed sufficiently by the internal pressure and it re-engages the adjacent surface 48. The memory properties of the resilient material from which member 70 is made cause the member to return to its initial configuration in abutting relation with case wall surface 48 and closure wall surface 50. If pressure again builds in the chamber, the finger portion will again deform to open and relieve the excess pressure. In the preferred embodiment of the invention, the resilient member is made from 500° F. silicone rubber, which has a hardness of approximately 50 Durometer. The finger portion is sized to relieve pressure in the chamber at approximately 10 PSIG. Of course, in other embodiments, other configurations and materials may be used.

Although in the preferred embodiment of the invention, the inner fluid passage 76 is achieved as a result of the differences in contour between the dial supporting flange surface 66 and dial wall 30, in other embodiments comparable fluid passage means may be used. For example, recesses or other passages may extend through bushing member 52. Alternatively, a separate fluid passage may extend through dial wall 30 remote from bushing member 52 into the area bounded by dial wall 30 and case wall 24. In other embodiments, other types of fluid passages may be used in place of passage 78. However, in such alternative embodiments, consideration should be given to avoiding the introduction of additional water into the device during washing.

Although the preferred embodiment of the present invention includes a closure member that has a closure wall surface extending generally parallel and opposed to the wall surface bounding the opening. In other embodiments, somewhat different configurations for the surfaces and resilient members may be used with satisfactory results. For example, the resilient member may be inverted from that shown in FIG. 2 so that pressure is relieved by the deformable lip portion disengaging the closure wall surface adjacent to the deformable lip portion.

The construction of the present invention also prevents the introduction of excessive moisture into chamber 38 during washing or immersion in water. This results because the radially outward extending finger portion is resistant to external pressure forces. Such forces tend to increase the sealing force of the finger portion against surface 48. The apparatus may be used in harsh environments including automatic dishwashing machines, which include high temperature and pressure water sprays. As a result, the preferred embodiment of the invention is a reliable temperature sensing apparatus that is durable and has a long useful life.

Thus the new temperature sensing apparatus of the present invention achieves the above stated objectives, eliminates difficulties encountered in the use of prior devices and systems, solves problems and attains the desirable results described herein.

In the foregoing description certain terms have been used for brevity, clarity and understanding. However, no unnecessary limitations are to be implied therefrom because such terms are for descriptive purposes and are intended to be broadly construed. Moreover, the descriptions and illustrations given are by way of examples and the invention is not limited to the exact details shown and described. Further, in the following claims, any features of the invention which are described as a means for performing a function are to be construed as covering any means capable of performing the function and are not limited to the particular means shown herein or equivalents.

Having described the features, discoveries and principles of the invention, the: manner in which it is operated and utilized and the advantages and useful results attained; the new and useful structures, devices, elements, arrangements, parts, combinations, systems, equipment, operations, methods and relationships are set forth in the appended claims.

I claim:

1. An apparatus for indicating a condition in an environment, comprising:

a body enclosing a chamber, said body including a case wall having art opening therethrough, said case wall having an outer case wall surface extending in surrounding relation of said opening;

an indicator housed in the chamber indicating a condition of the environment;

a closure member overlying said opening and disposed outwardly of said chamber, said closure member having a closure wall surface disposed from and in facing opposed relation of said case wall surface;

a resilient member extending in abutting relation between said closure wall surface and said case wall surface, said resilient member extending in surrounding relation of said opening, wherein pressure in said chamber deforms said resilient member to disengage one of said wall surfaces whereby said pressure is relieved.

2. The apparatus according to claim 1 wherein said opening is circular and wherein said resilient member is an annular member having a radially outward extending annular lip portion adjacent one of said wall surfaces.

3. The apparatus according to claim 2 wherein said lip portion engages said case wall surface.

4. The apparatus according to claim 2 wherein said lip portion is deformable responsive to fluid pressure in said chamber to disengage said one wall surface.

5. The apparatus according to claim 2 wherein said resilient member further comprises an annular base portion, said base portion deformable to a lesser extent than said finger portion responsive to fluid pressure, and wherein said finger portion extends longitudinally and radially outward from said base portion.

6. The apparatus according to claim 5 wherein said closure member includes an annular recess, wherein said closure wall surface bounds said recess, and wherein said resilient member is positioned in said recess.

7. The apparatus according to claim 1 wherein said closure member includes an outer annular flange in surrounding relation of said resilient member.

8. The apparatus according to claim 1 and further comprising a tube extending in centered relation of said opening, wherein said closure member is supported by said tube.

9. The apparatus according to claim 8 and further comprising an inner annular flange surface supported by said tube, said inner annular flange surface disposed inwardly of said chamber and in opposed facing relation of said closure wall surface; and further comprising a spring member extending between said inner annular flange surface and said case wall.

10. The apparatus according to claim 9 wherein said closure member further comprises an outer annular flange portion in surrounding relation of said resilient member, said outer annular flange portion engaging said outer case wall surface, whereby said case wall is held in intermediate relation of said spring member and said outer flange portion.

11. The apparatus according to claim 11 and further comprising an outer fluid passage bounded by said outer annular flange portion and said case wall.

12. The apparatus according to claim 8 and further comprising a connecting bushing member including an annular bushing portion extending in said tube, wherein said tube is positioned in radially intermediate relation of said bushing portion and said closure member.

13. The apparatus according to claim 8 and further comprising a connecting bushing member in connection with said tube portion, said connecting bushing member having an inner annular extending flange surface, disposed in said chamber and in opposed facing relation of said closure wall surface and wherein said case wall is held in intermediate supported relation longitudinally between said closure member and said inner annular flange surface.

14. The apparatus according to claim 13 and further comprising a dial wall disposed longitudinally inwardly in said chamber from said case wall, said dial wall supported on said connecting bushing member.

15. The apparatus according to claim 14 and further comprising an inner fluid passage bounded by said dial wall and said connecting bushing member.

16. The apparatus according to claim 13 wherein said connecting bushing member includes a dial supporting flange surface supporting a dial wall.

17. The apparatus according to claim 13 and further comprising a shaft extending in rotatably journaled relation through said connecting bushing member, said shaft extending into said chamber; wherein said indicator in said chamber is connected to said shaft.

18. An apparatus comprising:
  a body, said body enclosing a chamber, said chamber bounded by a frangible transparent portion and a case wall, said case wall having an opening therethrough, said case wall having an outer case wall surface extending in surrounding relation of said opening;
  an indicator housed in said chamber and visible through said frangible portion;
  a closure member disposed outwardly of said chamber from said opening, said closure member having a closure wall surface in opposed facing relation of said case wall surface;
  a member extending in abutting relation between said closure wall surface and said case wall surface, said member having a resilient lip portion extending in surrounding relation of said opening and in abutting relation with one of said wall surfaces, wherein said lip portion is deformable to disengage said abutting surface responsive to pressure in said chamber, whereby pressure in said chamber is relieved.

19. An apparatus for indicating a condition in an environment comprising:
  a body enclosing a chamber;
  a indicator in said chamber indicating a condition in the environment;
  a wall bounding said chamber having an outer case wall surface, said wall having an opening therethrough;
  a closure member overlying said opening, said closure member having a closure wall surface disposed outwardly from said chamber and in opposed facing relation of said case wall surface;
  a member comprised of resilient material extending between said wall surfaces and in abutting relation therewith, wherein pressure in said chamber deforms said resilient member to disengage one of said surfaces to relieve pressure from said chamber.

20. An apparatus for indicating a condition in an environment comprising:
  a body enclosing a chamber;
  an indicator in said chamber indicating a condition in the environment;
  a case wall bounding said chamber, said wall having an opening therethrough;
  a closure wall surface extending externally of said chamber and in overlying relation with said opening;
  a member extending in closing relation of said opening, said member including a deformable lip portion engaging said closure wall surface and wherein pressure in said chamber deforms said lip portion to disengage said wall surface to relieve pressure from said chamber.

* * * * *

UNITED STATES PATENT AND TRADEMARK OFFICE
CERTIFICATE OF CORRECTION

PATENT NO. : 5,567,053
DATED : October 22, 1996
INVENTOR(S) : John B. Ashe

It is certified that error appears in the above-indentified patent and that said Letters Patent is hereby corrected as shown below:

Column 6, line 48, "art" is changed to -- an --.

Signed and Sealed this

Twenty-fourth Day of December, 1996

Attest:

BRUCE LEHMAN

Attesting Officer

Commissioner of Patents and Trademarks